United States Patent [19]
Dean et al.

[11] Patent Number: 5,937,036
[45] Date of Patent: Aug. 10, 1999

[54] METHOD AND APPARATUS FOR SENSING EXTERNAL ALARMS USING A STANDARD TELEPHONY INTERFACE

[75] Inventors: Matthew T. Dean; Michael Worsham, both of Campbell, Calif.

[73] Assignee: Siemens Information and Communication Networks, Inc., Boca Raton, Fla.

[21] Appl. No.: 08/772,165

[22] Filed: Dec. 20, 1996

[51] Int. Cl.⁶ .................................................. H04M 11/04
[52] U.S. Cl. ............................................. 379/44; 379/48
[58] Field of Search .......................... 379/39, 40, 42–45, 379/38, 50, 47, 48; 340/506, 525

[56] References Cited

U.S. PATENT DOCUMENTS

| | | |
|---|---|---|
| 3,120,579 | 2/1964 | Stewart . |
| 3,598,917 | 8/1971 | DeRaedt, et al. . |
| 3,644,894 | 2/1972 | McCrea . |
| 3,868,479 | 2/1975 | Schwieitzer, et al. . |
| 4,574,355 | 3/1986 | Beatty, et al. . |
| 4,742,518 | 5/1988 | Shedd . |
| 4,953,200 | 8/1990 | Yamasaki . |
| 5,063,585 | 11/1991 | Shapiro . |
| 5,163,080 | 11/1992 | Amoroso, et al. . |
| 5,276,727 | 1/1994 | Kim, et al. . |
| 5,345,497 | 9/1994 | Amoroso, et al. . |
| 5,363,435 | 11/1994 | Demunck . |
| 5,410,591 | 4/1995 | Takahashi . |
| 5,457,730 | 10/1995 | Rounds ..................................... 379/40 |
| 5,485,511 | 1/1996 | Iglehart, et al. . |
| 5,561,703 | 10/1996 | Arledge, et al. . |

Primary Examiner—Jack Chiang

[57] ABSTRACT

A private branch exchange is provided having the capability of receiving external alarms via the standard telephony line or trunk interfaces. According to one embodiment, a PBX 200 includes a switching control circuit 202 having line monitor 212 and DTMF 210 capabilities. The switching control circuit 202 is coupled to a central processing unit 204 which in turn is coupled to a memory 206. The memory 206 stores a database 208 identifying a predetermined number of telephony trunk 214 and/or line input/output circuits 218 over which external alarms are to be reported. The CPU 204 identifies an external alarm contact closure as a fault on the telephone line or trunk, thereby insuring proper identification of the location of the alarm.

18 Claims, 6 Drawing Sheets

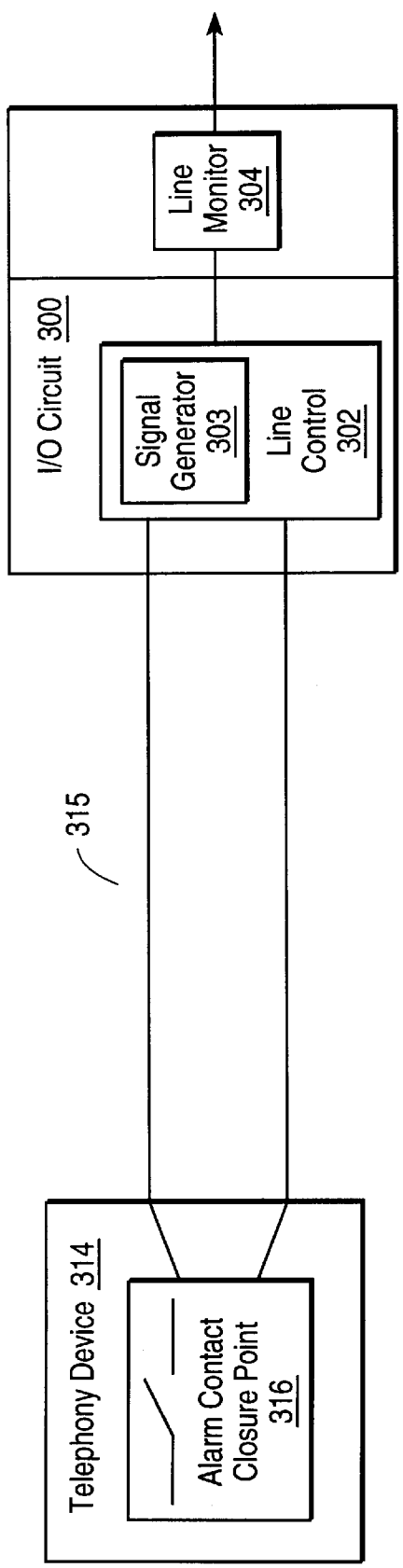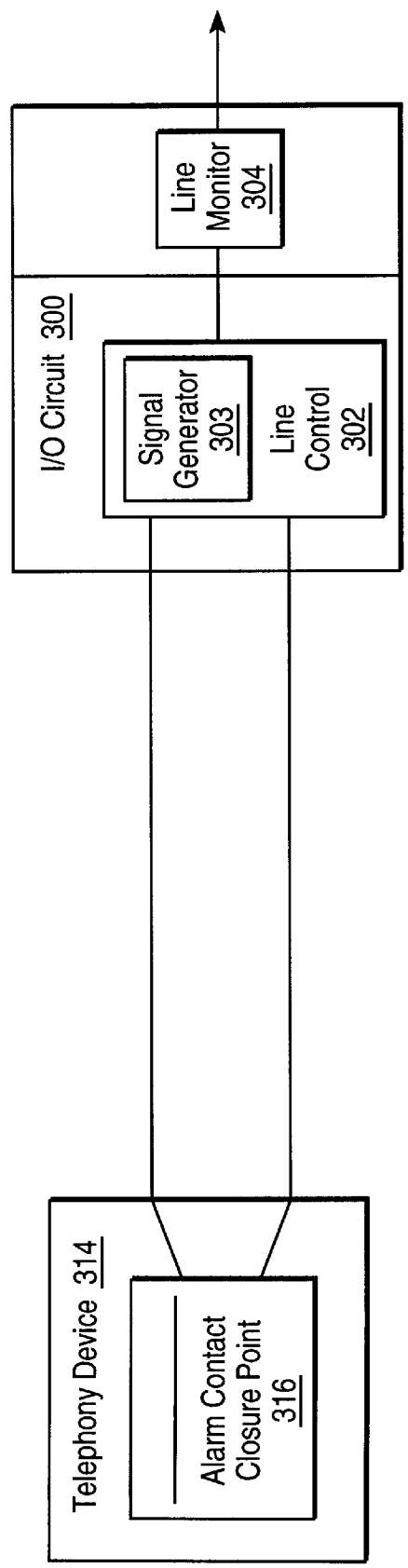
FIG. 3A
FIG. 3B

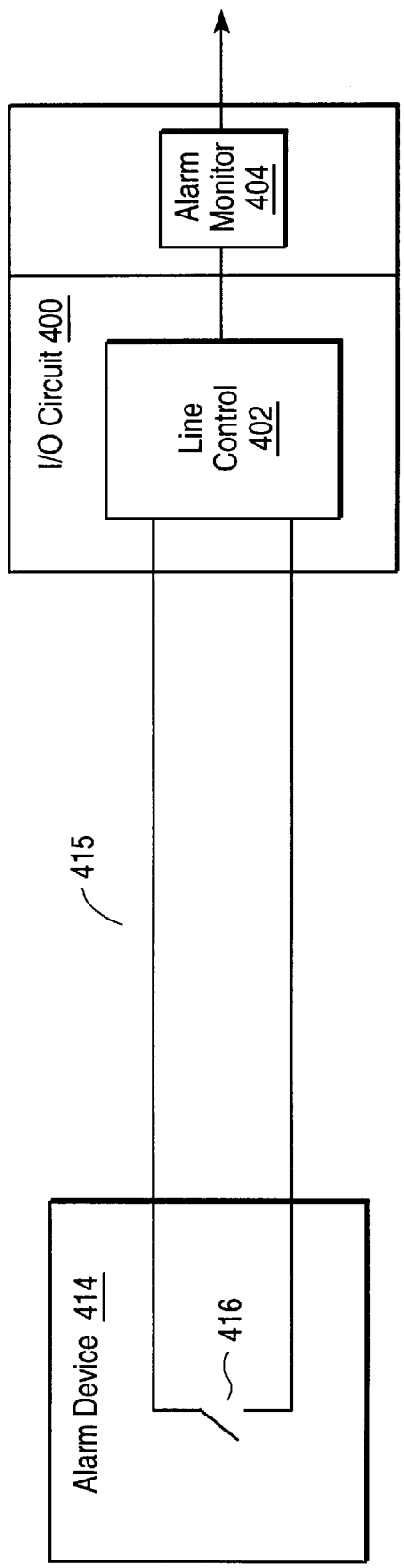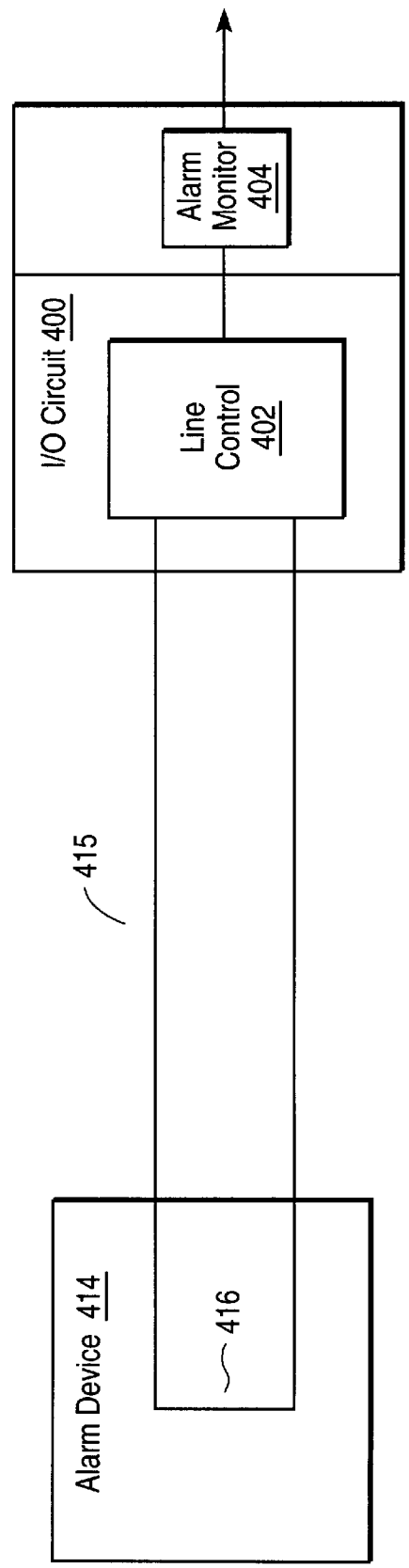
FIG. 4A
FIG. 4B

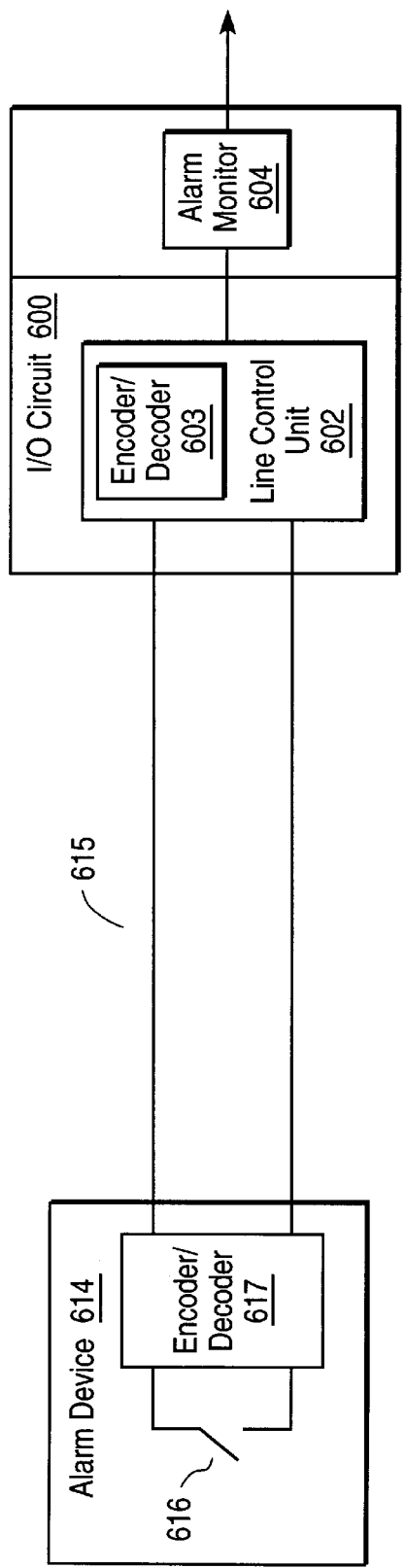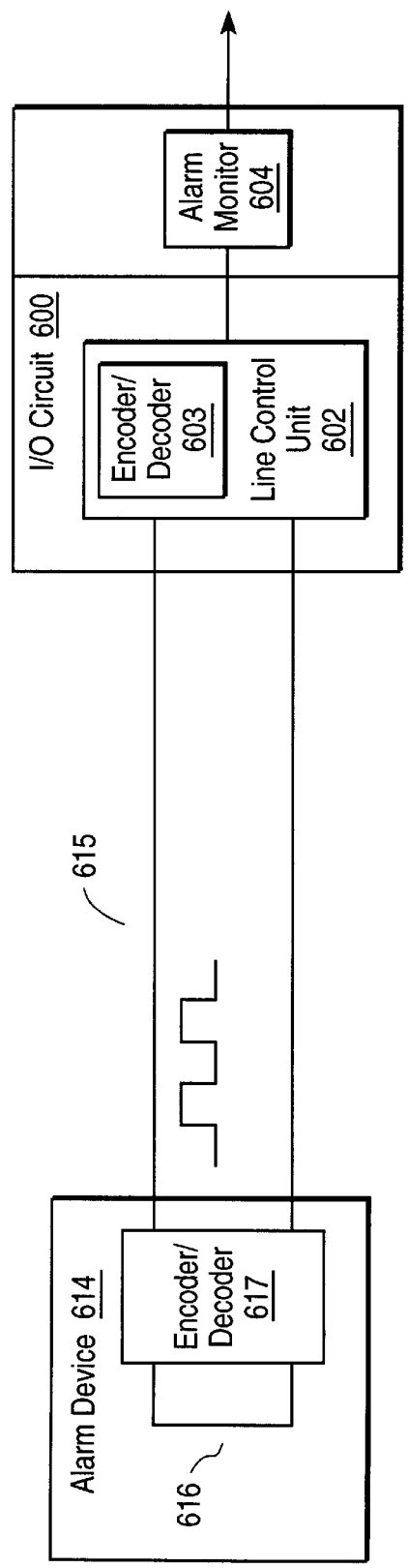
FIG. 5A
FIG. 5B

METHOD AND APPARATUS FOR SENSING EXTERNAL ALARMS USING A STANDARD TELEPHONY INTERFACE

BACKGROUND OF THE INVENTION

1. Field of the Invention

The present invention relates to telephone systems and, more particularly, to a method and apparatus for a private branch exchange (PBX) to sense external alarms using standard telephony interfaces.

2. Description of the Related Art

Private branch exchanges (PBX's) are circuit switches that provide communication paths among a plurality of users and communications systems, typically within the limits of a private institution. A PBX connects the users to one another, as well as interfaces to the public switched telephone network (PSTN), for example, via a local central office. In addition, a PBX can interface telephony conversations, voice or phone mail, facsimile, and electronic mail systems. In addition, the PBX may provide a variety of customer features, such as call hold, call forwarding, automatic call-back, conference calling, and the like.

Thus, PBX's are required to monitor a variety of trunk and telephony lines for a variety of conditions. For example, in the case of a telephone connection, a PBX monitors the line for on- and off-hook states. In response to detecting an off-hook state, the PBX supplies a dialtone and waits to receive dialed digits (either pulse or DTMF (dual tone multi-frequency) tones). The PBX further identifies the call destination, sends a ringing signal via the appropriate destination line or trunk, and either provides a busy signal or connects the subscriber with the called party. The PBX also provides a fast busy signal if no circuits are available.

The PBX may also provide a variety of maintenance features. Thus, the PBX monitors the telephone lines for conditions indicative of line faults, such as by detecting changes in impedance along the lines. For example, in the case of a subscriber telephone unit, the PBX can detect an open-circuited conductor, a short circuit between tip and ring conductors, short circuits to ground, or undesired electrical paths between subscriber loops. Another type of fault can occur if the off-hook state is detected and no dialed digits are detected; in response, the PBX transmits a warning signal across the telephone line to alert the subscriber that the telephone is off-hook.

In order to accomplish this functionality, PBX's include a plurality of input/output circuits, or ports. These enable the PBX to connect, for example, via telephone, data and trunk lines to the appropriate connected system or systems. In addition, PBX's typically include a predetermined number of alarm ports. The alarm ports are dedicated ports configured to receive alarms signals from a particular device. Such alarms can include, for example, indications of system failure from linked telephony systems (i.e., other PBX's, cellular telephone base stations, voice mail, facsimile and e-mail units), indications of individual device failure, or alarms related to premises activity and unrelated to specific telephone or telecommunications activity, such as intruder or fire alarms.

Alarms are activated at the alarm device and sensed at the PBX through standard circuitry. More particularly, alarms are activated at the alarm device through a circuit known as an alarm contact closure point. The alarm contact closure point is essentially a switch that is closed upon the sensing of the associated alarm condition. In an analog telephone system, activating the alarm contact closure point causes a change in impedance of the line connecting the alarm contact closure point with the PBX. Typically, a circuit is completed, and current flows across the line. The alarm port at the PBX detects the current or change in impedance and, for example, signals an interrupt executable by a control processor at the PBX. In a digital telephone system, activation of an alarm contact closure point causes a predetermined signal to be returned to the PBX, which is detected as the alarm condition.

The number of alarm ports provided on PBX's is quite small (typically fewer than three are provided), due in large part to space constraints. As the number of alarm ports increases, the number of ports available for data and telephone and trunk lines necessarily decreases correspondingly. However, the number of systems which are typically desired to be connected to PBX's and to provide alarm indications has increased.

Accordingly, in many systems, external equipment such as an external switching device or multiplexer is provided to receive a plurality of alarm lines and multiplex them to the PBX's alarm port. Because the alarm port on the PBX is a standard and relatively unsophisticated interface, however, while the PBX receives the alarm, it is unable to identify the particular device which has triggered the alarm. Thus, the external switching device must be provided with additional circuitry to identify which device has triggered the alarm and, also, in many cases, to provide a modem for providing an alarm message to an appropriate service bureau or to the PBX itself.

Such external equipment is not necessarily provided by the same vendor as the vendor of the PBX itself, and as such, additional logistical and training costs are incurred. Therefore, an improved alarm sensing mechanism is desired. Nonetheless, the number of existing alarm devices is quite large and any alteration to the accepted standard would encounter user resistance unless backwards compatibility were provided. Therefore, an improved alarm sensing mechanism and method is desired which minimizes external equipment and maintains backward compatibility with prior alarm devices.

SUMMARY OF THE INVENTION

Accordingly, a private branch exchange is provided having the capability of receiving external alarms via the standard telephony line or trunk interfaces. According to one embodiment, a PBX includes a switching control circuit having line scanner and DTMF capabilities. The switching control circuit is coupled to a central processing unit which in turn is coupled to a memory. The memory stores a database identifying a predetermined number of trunk and/or line interfaces or ports over which external alarms are to be reported. The CPU identifies an external alarm contact closure as a fault on the telephone line or trunk, thereby insuring proper identification of the location of the alarm.

According to one embodiment of the present invention, closing the alarm contact closure for a device coupled into the telephone line input of a PBX causes current to flow on the line, in a manner similar to that which occurs when a telephone handset is lifted from its cradle, thereby closing the hook switch. However, rather than sending the dialtone, a control CPU in the PBX references a database to determine whether or not the line is one for which telephony functions are to be performed or one for which alarm functions are to be performed. If the database indicates that the line or trunk circuit is one for which alarm functions are to be performed, the CPU activates an internal modem and executes a call to an outside service bureau. The message to the outside service bureau will contain the identification of the device which has asserted the alarm.

According to another embodiment, the PBX periodically monitors each of the lines for a predetermined impedance. Activating an alarm contact closure point on the appropriate device causes a change in the corresponding line's characteristic impedance. Rather than detecting this change in the line's impedance as a line fault, however, the CPU in the PBX references a database to determine whether or not the line is one for which telephony functions are to be performed or one for which alarm functions are to be performed. If the database indicates that the line or trunk circuit is one for which alarm functions are to be performed, the CPU activates an internal modem and executes a call to an outside service bureau. The message to the outside service bureau will contain the identification of the device which has asserted the alarm.

In a still further embodiment, a digital telephone system is provided. Activating the alarm contact closure point for a device coupled into the telephone line input of a PBX causes a predetermined encoded signal to be transmitted along the line to the PBX. The signal is, for example, the same as that which occurs when a telephone handset is lifted from its cradle, thereby closing the hook switch. However, rather than sending the dialtone, a control CPU in the PBX references a database to determine whether or not the line is one for which telephony functions are to be performed or one for which alarm functions are to be performed. Alternatively, a nonencoded signal is returned, such as that representative of a fault on the line and, again, the database is referenced. If the database indicates that the line or trunk circuit is one for which alarm functions are to be performed, the CPU executes a call to an outside service bureau. The message to the outside service bureau will contain the identification of the device which has asserted the alarm.

BRIEF DESCRIPTION OF THE DRAWINGS

A better understanding of the present invention can be obtained when the following detailed description is considered in conjunction with the following drawings in which:

FIG. 3A and FIG. 3B illustrate PBX detection of an alarm condition according to one embodiment of the present invention;

FIG. 4A and FIG. 4B illustrate PBX detection of an alarm condition according to another embodiment of the present invention;

FIG. 5A and FIG. 5B illustrate PBX detection of an alarm condition according to another embodiment of the present invention.

DETAILED DESCRIPTION OF THE INVENTION

Figure 1:
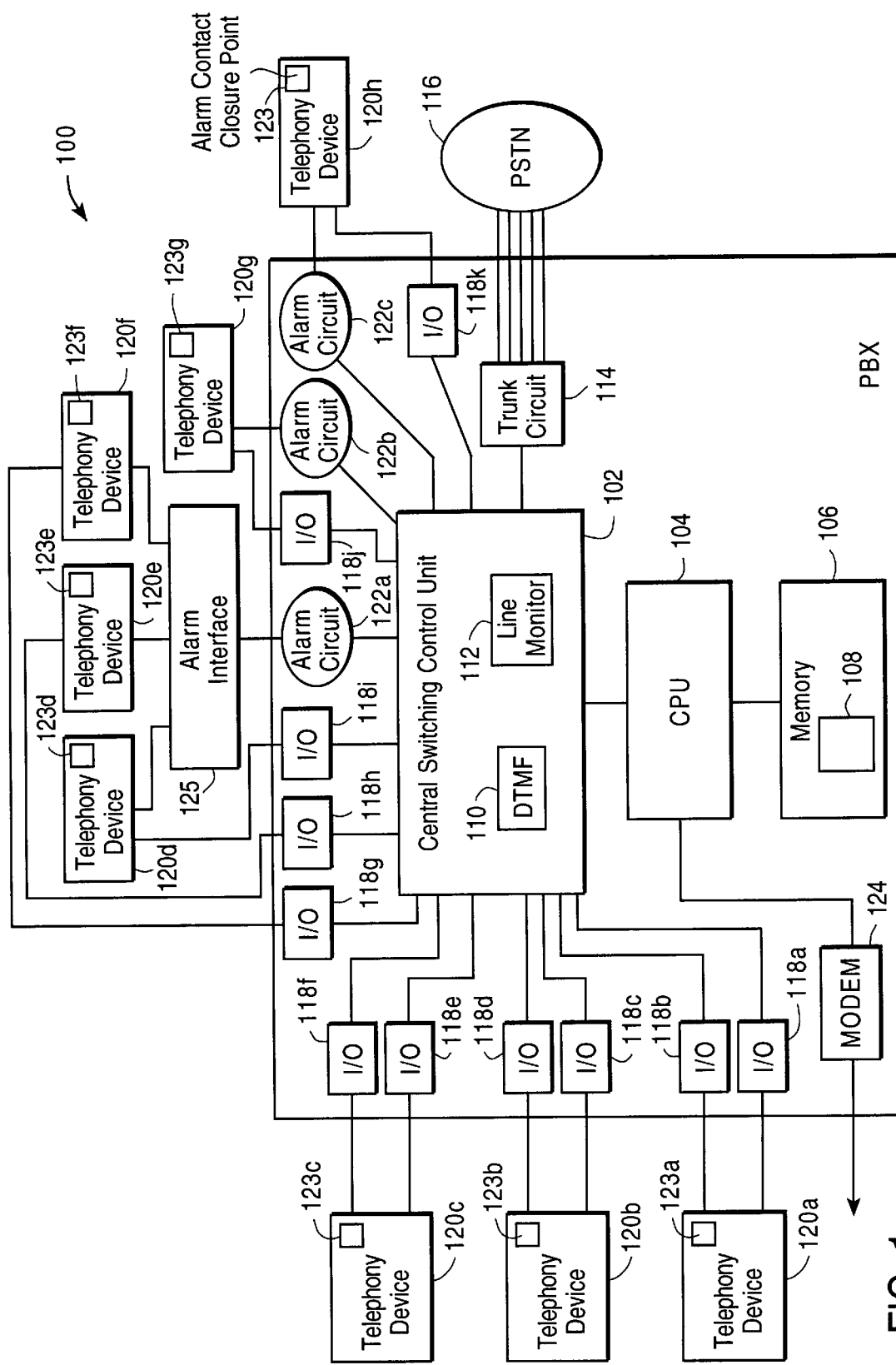
FIG. 1 is a diagram of a private branch exchange employing alarm sensing techniques according to one embodiment of the present invention.

FIG. 1—Standard Telephony Interface for Alarm Sensing in Legacy PBX

With reference to FIG. 1, a private branch exchange (PBX) 100 is illustrated which employs the teachings of the present invention while maintaining compatibility with existing installed hardware. The term "PBX" as used herein includes a private branch exchange, as well as a computer system and associated switching circuitry programmed to perform a PBX function such as an SCSA (Signal Computing System Architecture) computer system.

PBX 100 includes a central switching control circuit 102 coupled to a central processing unit (CPU) 104, which in turn, is coupled to a memory 106. A predetermined portion 108 of memory 106 is dedicated to storing a database including alarm information, as will be described in greater detail below. Central switching control circuit 102 includes a dual tone multi-frequency (DTMF) circuit 110 and line monitor or scanner circuit 112. Central switching control circuit 102 provides connectivity between the community of users under the control of the CPU 104. Memory 106 comprises read-only memory (ROM) and/or random access memory (RAM), nonvolatile random access memory (NVRAM), or other storage device for storing program and service data necessary to generate basic calls and perform functions of the PBX 100. PBX 100 further includes one or more trunk circuits 114 coupled to the public switched telephone network (PSTN) 116. Also coupled to CPU 104 is a modem or other interface 124 configured to transmit an alarm signal to a service bureau (not shown) indicative of an alarm condition, as will be discussed in greater detail below. As used herein, the term "modem" refers to a standard modem or other terminal adapter, such as an ISDN terminal adapter.

In addition, a plurality of input/output circuits 118a–118k interface the PBX 100 to a plurality of a telephony devices 120a–120h. Telephony devices 120a–120h may comprise for example, telephones, modems, or telephone systems such as other PBX's and the like. Input/output circuits 118a–118k comprise, for example, telephone line circuits, data line circuits, or trunk circuits (As used herein, the terms "telephone line" and "telephony line" shall refer to telephone lines, telephony lines, data lines, or trunk lines). Devices 120a–120c are each coupled to the PBX 100 via two input/output circuits, according to the present invention, as will be discussed in greater detail below. In addition to the input/output circuits, the PBX 100 includes a plurality of dedicated alarm circuits 122a–122c for coupling devices 120d–120h to the central switching control circuit 102. Alarm devices 120g and 120h couple directly to the alarm circuits 122b, 122c, respectively. Alarm devices 120d–120f couple to alarm circuit 122a via alarm interface 125. Alarm interface 125 is a legacy or prior art device, typically external to PBX 100, which multiplexes the respective alarm lines to the alarm circuit 122a.

Telephony devices 120a–120h are each provided with an alarm contact closure point 123a–123h, respectively. It is noted that in alternative embodiments, telephony devices not having alarm contact closure points may be coupled to PBX 100. It is further noted that, while described in the context of telephony alarms, one or more of devices 120a–120h may be configured to provide notice of alarm conditions unrelated to specific telephony activity, such as fires or burglaries.

When an alarm is sensed at the respective device 120a–120h, the appropriate alarm contact closure point is activated (typically closed) and the alarm provided to the PBX 100. More particularly, when an alarm is triggered at devices 120g, 120h, their corresponding contact closure points 123g, 123h are activated and the alarm is sensed at the alarm circuit 122b, 122c, respectively. When an alarm at devices 120d–120f is triggered, the alarm contact closure point 123d–123f is activated, and the alarm is sensed at alarm interface 125. Alarm interface 125 transmits a corresponding signal to be detected by the PBX 100 at alarm circuit 122a.

However, when an alarm is triggered by devices 120a–120c, the handling of the alarm differs. In this instance, handling of the alarms is performed according to an embodiment of the present invention. As noted above, the devices 120a–120c each couple to the PBX 100 via two input/output circuits according to one embodiment of the present invention. One of the input/output circuits is provided for standard telephony functionality; the other is provided to receive the alarm signals from activation of the corresponding alarm contact closure points. According to an embodiment of the present invention, the telephony interfaces which receive the alarm signals from devices 120a–120c are standard telephony input/output circuits, rather than dedicated and different hardware. The alarm signals are preferably the same as one or more telephony signals, such as a telephony line fault signal, but the PBX is programmed to respond to it differently.

More particularly, database 108 in memory device 106 is programmed with information concerning the functionality of each of the input/output circuits 118a–118k. This preferably occurs when each telephony device is installed, though may occur at the factory prior to shipping. Alternatively, the database may comprise a memory module which is installed on-site, rather than programmed. The stored information includes whether the functionality of the input/output circuit is standard telephony functionality or alarm functionality. If the input/output circuit is to receive a line having alarm functionality, then the database stores information related to the change of condition or type of line fault represented by the activation of the device's alarm contact closure point.

In one analog embodiment, activation of the alarm contact closure point on a telephony line creates a circuit similar to that created when a telephone enters the off-hook condition. More particularly, when the alarm contact closure point is activated, a switch is closed, causing current to flow across the line. This is detected by the PBX in much the same way as an off-hook condition is detected on a line. After detecting the off-hook condition, the processor 104 accesses the database 108 to determine the nature of the off-hook signal. Thus, rather than providing a dialtone, the PBX 100, after accessing database 108, provides a signal to the modem 124, which signals the alarm to the service bureau. The signal to the service bureau contains additional information, such as the identity and location of the device triggering the alarm. It is noted that in this embodiment, first and second current levels may be detected, rather than current and no current.

In an alternate analog embodiment, the PBX 100 monitors each of the telephony lines for changes in impedance. For example, when a particular telephony device is not in use, the PBX 100, under the control of the CPU 104, transmits one or more predetermined signals over the lines, which are used to measure the line impedance, but are not of sufficient magnitude, for example, to activate a telephone ringer. In the case of a telephony device coupled to the line, a variation of the impedance from a predetermined level is an indication of a fault on the line, such as, for example, a short circuit or an open circuit.

Similarly, activation of an alarm contact closure point coupled to a telephony line causes a change in the line's impedance. The change in the impedance of a line to which an alarm contact closure point is coupled results in an alarm condition being triggered at the PBX. Thus, the database 108 is programmed with information for each telephone line concerning whether a change of impedance (or which change in impedance) denotes a standard telephone line fault, or an alarm condition. Once the CPU 104 determines that the line impedance change has been caused by the triggering of a contact closure point, the CPU 104 signals the service bureau.

In still another embodiment of the present invention employing digital telephony lines, the PBX 100 monitors the telephony lines for encoded signals indicative of predetermined conditions, such as line faults or off-hook states. Activation of an alarm contact closure point at a device coupled to the particular digital telephony line causes a predetermined encoding to be received at the PBX 100. This may be the same as a standard telephony encoding, such as for reception of an off-hook state, or may be a unique encoding indicative of the alarm. In either case, the command is decoded by the PBX 100 and the control CPU 104 in the PBX accesses the database 108 to determine whether it should respond to the message as an alarm or a telephony function.

Alternatively, activation of an alarm contact closure point is detected at the PBX 100 as a nonencoded signal indicative of line failure. For example, in a digital telephone system, signals are conveyed between devices using a predetermined digital link protocol. If the line is short circuited, the protocol is no longer being provided. This is detected at the PBX as a hard failure. Similarly, activation of an alarm contact closure point causes the hard failure signal to be received at the PBX 100. The PBX 100 then accesses the database 108 to determine whether it should respond to the hard failure signal as an alarm or a telephony line fault.

It is noted that in the embodiment illustrated in FIG. 1, an alarm interface 125 is illustrated. If the system and method of the present invention are employed for all alarms, users of installed equipment can remove the alarm interface 125 and instead couple the alarm lines of the devices 120d–120f (as well as 120g–120h) to standard input/output circuits. It is further noted that the number of input/output circuits and alarm circuits illustrated is exemplary only.

Figure 2:
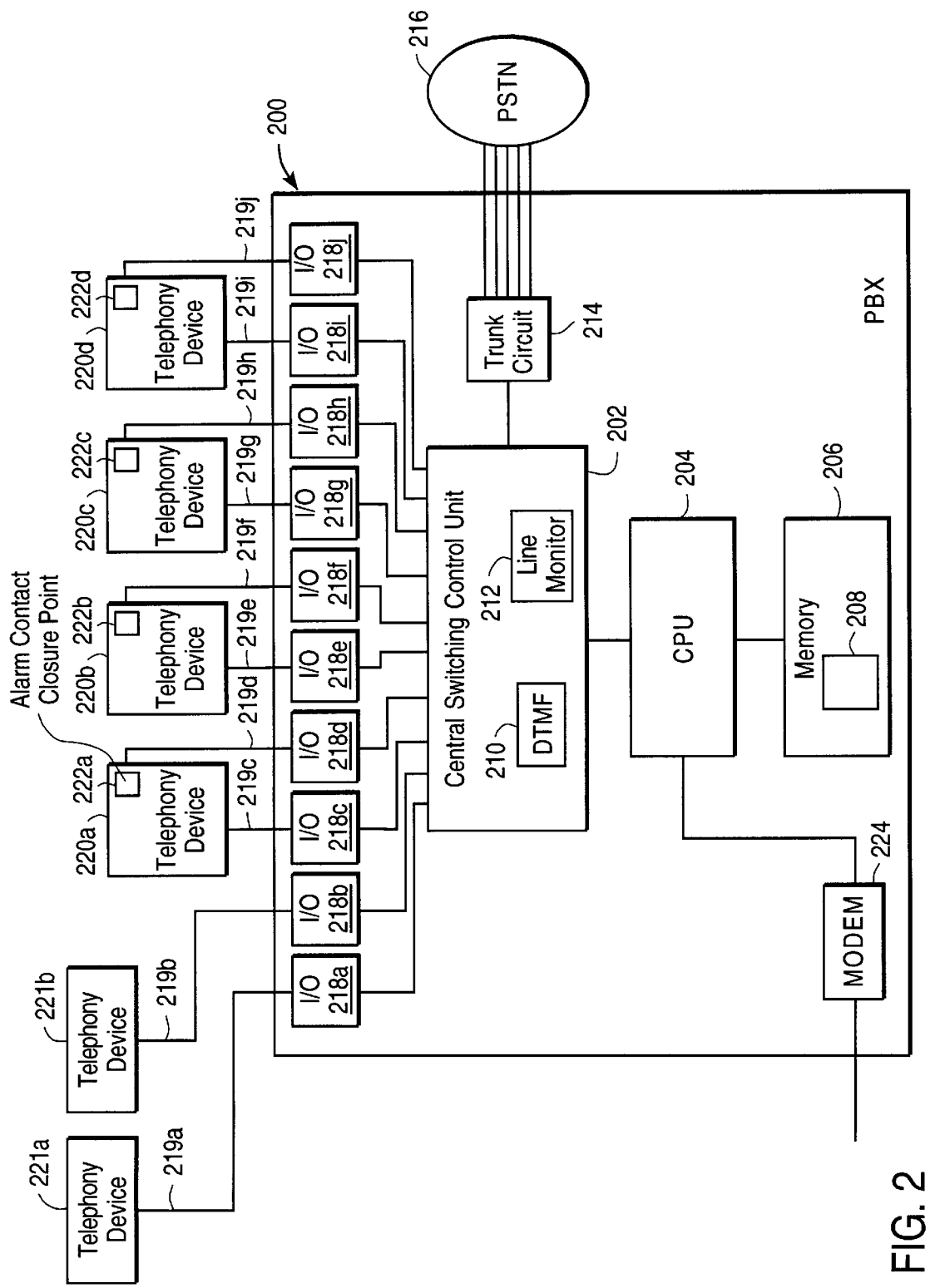
FIG. 2 is a diagram of a private branch exchange employing alarm sensing techniques according to another embodiment of the present invention.

FIG. 2—PBX Detecting External Alarms Using Standard Telephony Interface

Turning now to FIG. 2, a block diagram is shown of a private branch exchange 200 employing alarm detection and sensing according to one embodiment of the present invention. PBX 200 includes a central switching control circuit 202 coupled to a central processing unit (CPU) 204, which in turn, is coupled to a memory 206. A predetermined portion 208 of memory 206 is dedicated to storing a database including alarm information, as will be described in greater detail below. Central switching control circuit 202 includes a dual tone multi-frequency (DTMF) circuit 210 and line monitor or scanner circuit 212. Central switching control circuit 202 provides connectivity between the community of users under the control of the CPU 204. Memory 206 comprises read only memory (ROM) and/or random access memory (RAM), nonvolatile random access memory (NVRAM) or other memory device. Memory 206 is capable of storing program and service data necessary to generate basic calls and perform functions of the PBX 200. PBX 200 further includes one or more trunk circuits 214 coupled to the public switched telephone network (PSTN) 216. Also coupled to CPU 204 is a modem or other interface 224 configured to transmit an alarm signal to a service bureau (not shown) indicative of an alarm condition, as will be discussed in greater detail below.

In addition, a plurality of input/output circuits 218a–218j interface the PBX 200 to a plurality of a telephony devices 221a–221b and 220a–220d via a plurality of telephony lines 219a–219j. Telephony devices 221a–221b and 220a–220d comprise, for example, telephones, modems, or telephone systems such us other PBX's and the like. Input/output circuits 218a–218j comprise, for example, telephone line circuits, data line circuits, or trunk circuits. Telephony devices 220a–220d are each coupled to the PBX 200 via two input/output circuits, as will be discussed in greater detail below. Telephony devices 221a–221b are each coupled to the PBX 200 by only a single input/output circuit.

Telephony alarm devices 220a–220d are each provided with an alarm contact closure point 222a–222d, respectively. It is noted that, while described in the context of telephony alarms, one or more of devices 220a–220d may be configured to provide notice of alarm conditions unrelated to specific telephony activity, such as fires or burglaries. When an alarm is sensed at the respective alarm device, the appropriate alarm contact closure point is activated (typically closed) and the alarm provided to the PBX 200. More particularly, as noted above, the telephony alarm devices 220a–220d each couple to the PBX 200 via two input/output circuits. One of the input/output circuits is provided for standard telephony functionality; the other is provided to receive the alarm signals from activation of the corresponding alarm contact closure points. However, the telephony interfaces which receive the alarm signals are standard telephony input/output circuits, rather than dedicated and different hardware. The alarm signals are preferably the same as one or more telephony signals, such as a telephony line fault signal, but the PBX is programmed to respond to it differently. Finally, telephony devices 221a–221b are not provided with alarm contact closure circuitry, and as such, each couple to the PBX 200 via a single input/output circuit.

Database 208 in memory device 206 is programmed with information concerning the functionality of each of the input/output circuits 218a–218j. This preferably occurs when each telephony device is installed, though may occur at the factory prior to shipping. Alternatively, a memory module containing the database may be installed on site, rather than programmed. The stored information includes whether the functionality of the input/output circuit is standard telephony functionality or alarm functionality. If the input/output circuit 218a–218j is to receive a line having alarm functionality, then the database 208 stores information related to the change of condition or type of line fault represented by the activation of the device's alarm contact closure point.

In one analog embodiment, activation of the alarm contact closure point 222a–222d on a telephony line creates a circuit similar to that created when a telephone enters the off-hook condition. More particularly, when the alarm contact closure point is activated, a switch is closed, causing current to flow across the line. This is detected by the PBX 200 in much the same way as an off-hook condition is detected on a line. After detecting the off-hook condition, the processor 204 accesses the database to determine the nature of the off-hook signal. Thus, rather than providing a dialtone, the PBX 200, after accessing database 208, will provide a signal to the modem 224, which will signal the alarm to the service bureau. The signal to the service bureau will contain additional information, such as the identity and location of the device triggering the alarm.

In an alternate analog embodiment, the PBX 200 monitors each of the telephony lines for changes in impedance. For example, when a particular telephony device is not in use, the PBX 200, under the control of the CPU 204, transmits one or more predetermined signals over the lines, which are used to measure the line impedance, but are not of sufficient magnitude, for example, to activate a telephone ringer. In the case of a telephony device coupled to the line, a variation of the impedance from a predetermined level is an indication of a fault on the line, such as, for example, a short circuit or an open circuit.

Similarly, activation of an alarm contact closure point coupled to a telephony line causes a change in the line's impedance. The change in the impedance of a line to which an alarm contact closure point is coupled results in an alarm condition being triggered at the PBX. Thus, the database 208 is programmed with information for each telephone line concerning whether a change of impedance (or which change of impedance) denotes a standard telephone line fault, or an alarm indication. Once the CPU determines that the line impedance change has been caused by the triggering of a contact closure point, the CPU 204 signals the service bureau.

In still another embodiment of the present invention employing digital telephony lines, the PBX 200 monitors the telephony lines for encoded signals indicative of predetermined conditions, such as line faults or off-hook states. Activation of an alarm contact closure point at a device coupled to the particular digital telephony line causes a predetermined encoding to be received at the PBX 200. This may be the same as a standard telephony encoding, such as for reception of an off-hook state. The command is decoded by the PBX 200 and the control CPU 204 in the PBX accesses the database 208 to determine whether it should respond to the message as an alarm or a telephony function.

Again, in an alternate embodiment, activation of an alarm contact closure point is detected at the PBX 200 as a hard failure signal. The PBX 200 then accesses the database 208 to determine whether it should respond to the hard failure signal as an alarm or a telephony line fault.

FIGS. 3A and 3B—Alarm Detection Using Impedance Measurements

Turning now to FIGS. 3A and 3B, detection of an alarm according to one embodiment of the present invention is illustrated. More particularly, an input/output circuit 300 within a PBX is illustrated. As illustrated in FIG. 3A, input/output circuit 300 includes a line control 302 which may include, for example, a relay and associated voltage source or signal generator 303. Line control 302 further is coupled to a line monitor 304. A telephony line 315 couples input/output circuit 300 to a telephony device 314, such as a telephone. Telephony device 314 includes an alarm contact closure point 316. Alarm contact closure point 316 is typically in the off position. Line monitor 304 periodically causes signal generator 303 to provide a signal along telephony line 315. With the alarm contact closure point in the off position, input/output circuit 300 will see a first predetermined impedance across line 315.

Turning now to FIG. 3B, when the alarm contact closure point 316 of telephony device 314 is activated, the signal transmitted along telephony line 315 by signal generator 303 will result in the detection of a second predetermined impedance along the line. In response to the detection of the second impedance, the CPU 104, 204 accesses the database, determines if the received signal should be interpreted as an alarm signal, and activates an alarm, thereby notifying a service bureau (not shown) of the alarm condition.

FIGS. 4A and 4B—Alarm Detection Using Current Detection

Turning now to FIGS. 4A and 4B, the use of current detection line fault techniques over standard telephony lines to detect alarms according to one embodiment of the present invention is illustrated. Turning now to FIG. 4A, PBX input/output circuit 400 includes line control 402 having a voltage source associated with each telephony line 415. Alarm monitor 404 is also coupled to line control 402. Line control 402 couples telephony line 415 to alarm device 414. Alarm device 414 is representative of, for example, any of a plurality of telephone systems or devices. Alarm device 414 includes a contact closure point 416, which is typically in the open position. Since alarm closure point 416 is open, no current flows along telephony line 415.

Turning now to FIG. 4B, upon detecting an alarm condition, the alarm contact closure point 416 of alarm device 414 is activated, thereby closing the circuit and causing current to flow along telephony line 415. Line control 402 thus couples an internal voltage source to the telephony line. Line monitor 404 includes a current monitor which detects the current across telephony line 415. Rather than sending a dialtone, or other telephony-specific response, however, line monitor 404 causes a central processing unit 104, 204 to access database 108, 208, determine if an alarm should be signaled, and alert a service bureau of the alarm.

FIGS. 5A and 5B—Alarm Detection on Digital Telephony Line

Turning now to FIGS. 5A and 5B, a block diagram of digital line fault techniques over standard telephony lines to detect alarms according to one embodiment of the present invention is illustrated. Turning now to FIG. 5A, PBX input/output circuit 600 includes line control unit 602 having an encoder/decoder 603 associated with each telephony line 615. Alarm monitor 604 is also coupled to line control 602. Encoder/decoder 603 is configured to encode and decode digital signals transmitted and received over telephony line 615. Line control 602 couples telephony line 615 to alarm device 614 and, for example, provides the digital signals on the line according to one or more digital line protocols. Alarm device 614 is representative of, for example, any of a plurality of telephone systems or devices. Alarm device 614 includes a contact closure point 616, which is typically in the open position. Alarm contact closure point 616 is coupled to the telephony line 615 by a line interface and encoder/decoder 617. Line interface and encoder/decoder 617 provides an interface to telephony line 615, encoding and decoding digital signals transmitted and received on the telephony line according to one or more line protocols.

Turning now to FIG. 5B, upon detecting an alarm condition, the alarm contact closure point 616 of alarm device 614 is activated, thereby closing the circuit and causing encoder/decoder 617 to provide a corresponding encoded signal along telephony line 615. The encoded signal is received at alarm control unit 602 and is decoded by encoder/decoder 603. The decoded signal is then provided to line monitor 604. Rather than sending a dialtone, or other telephony-specific response, however, line monitor 604 causes central processing unit 104, 204 to access database 108, 208, determine if an alarm should be signaled, and alert a service bureau of the alarm. It is noted that while the encoder/decoder units are shown as incorporated into the input/output circuits or ports, in alternate embodiments, the encoder/decoder units may be centrally comprised within the respective telephony device or PBX switching circuit, for example. Thus, FIG. 5 is exemplary only.

Alternatively, activating the alarm contact closure point causes a short circuit across the telephony line. The short is detected as a line fault at the line monitor 604, which provides a signal to the CPU 104, 204, causing it to access the database 108, 208. The CPU 104, 204 determines whether an alarm response or telephony line fault response should be initiated.

Figure 6:
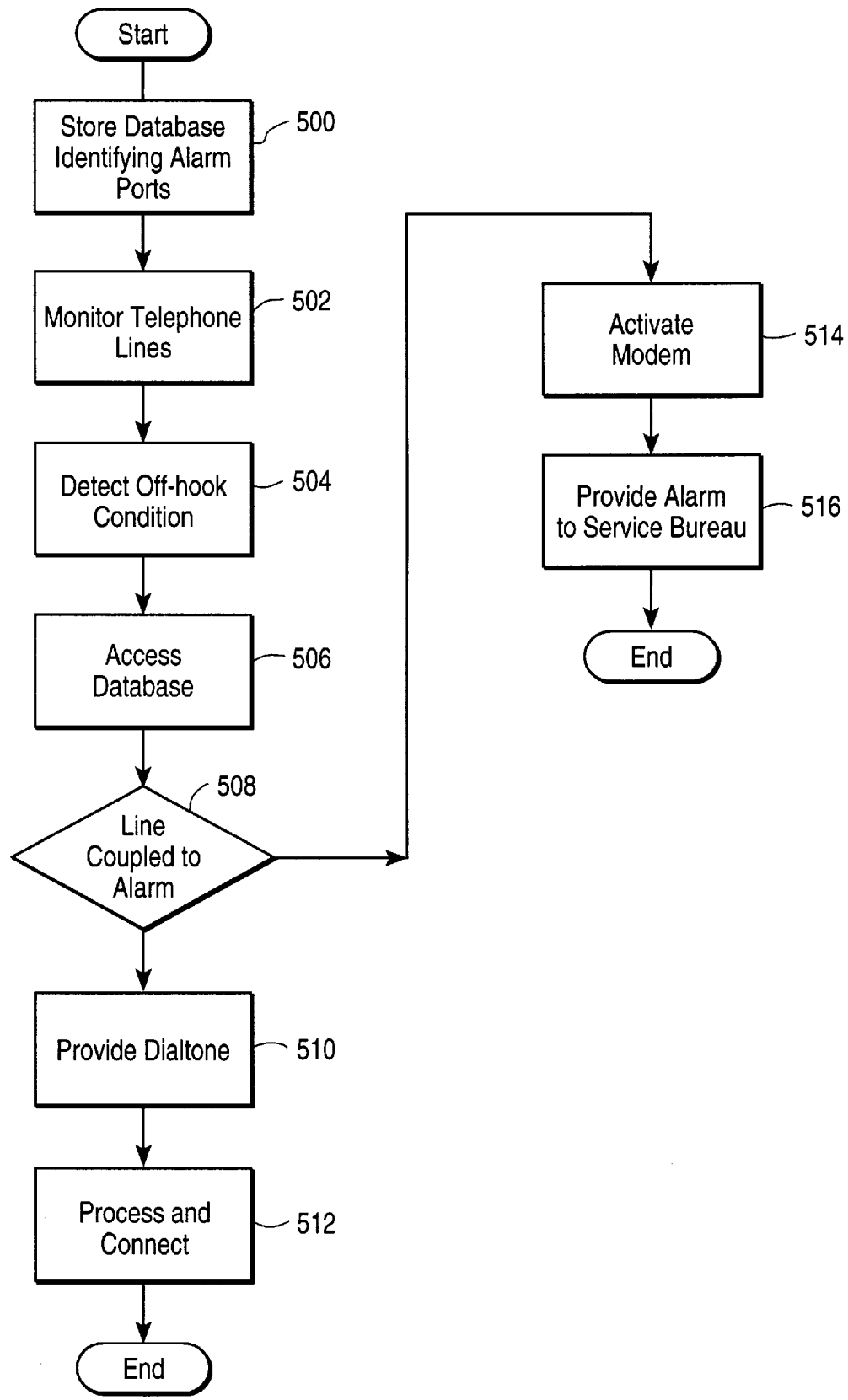
FIG. 6 is a flowchart illustrating the operation of a private branch exchange according to the present invention to detect alarms.

FIG. 6—Flowchart of Alarm Detection

Turning now to FIG. 6, a flowchart is illustrated showing the operation of an exemplary alarm detection mechanism according to an embodiment of the present invention. A database identifying the input/output circuits as being connected to lines having telephone functionality and alarm functionality is stored in memory unit 206 (Step 500). The database may be stored either upon assembly of the PBX or at a customer site by an external user interface such as a keyboard and monitor (not shown), or may be installed as a module. Alternatively, database 208 may be updated remotely via a modem connection or other standard mechanism. Database 208 may be comprised in any standard memory device such as read only memory, random access memory, non-volatile random access memory, or mass storage devices, such as disk drives.

Once the database has been loaded and the PBX is operational at the user's site, the PBX central switching control unit 202 monitors the telephony lines and trunks in the standard fashion (step 502). As discussed above, this can include monitoring for line faults, and monitoring the active telephony lines for switch hook activity (or, more generally, other activity indicative of normal or standard (including fault) operation of a telephony line) or for alarm contact closure. Upon detection of an activated line, off-hook, line fault or other predetermined condition (step 504), either through a current detector or impedance monitoring, or other analog or digital techniques, the CPU 204 accesses the database 208 (step 506). As noted above, the database contains information concerning which lines are dedicated for telephony functions and which lines are dedicated for alarm reception. The database is used by the CPU 204 to determine whether to interpret the received signal as a telephony signal or an alarm signal.

If the CPU 204, through accessing the database, determines that the line is coupled to an alarm contact closure point on a particular device (step 508), the CPU 204 activates a modem within the PBX (step 514). The CPU transmits via the modem the alarm information to a service bureau (step 516). The alarm information preferably includes not only an identification of the particular device which is experiencing the alarm condition, but also the location of the alarm device. If, in step 508, the CPU 204 determines that the line is in fact coupled to a telephony line, the CPU 204 provides a dialtone over the telephony line to the device in the off-hook condition (step 510). Once the dialtone has been provided to the telephony device, the telephone call is processed in the standard fashion (step 512).

The invention described in the above detailed description is not intended to be limited to the specific form set forth herein, but on the contrary, it is intended to cover such alternatives, modifications and equivalents as can reasonably be included within the spirit and scope of the appended claims. Such alternatives include, for example, both analog and/or digital implementations of the teachings herein.

We claim:

1. A private branch exchange (PBX) comprising:

a plurality of input/output circuits coupled to receive one or more signals over connected lines external to the PBX;

a central switching unit coupled to the plurality of input/output circuits and configured to provide connectivity for said one or more signals;

a central processing unit (CPU) coupled to said central switching unit and configured to control operation of said central switching unit; and a memory device coupled to the CPU and configured to store a database, said database including information identifying a first subset of said plurality of said input/output circuits as configured to receive telephony signals, and a second subset of said plurality of said input/output circuits as configured to receive alarm signals;

wherein the CPU is operable to access the database when said one or more signals are received at a respective input/output circuit to determine if said one or more signals are telephony signals or alarm signals; and wherein each of said second subset is configured to receive signals from over respective ones of said connected lines indicative of an alarm contact closure from a respective device coupled to a respective one of said second subset.

2. The PBX of claim 1, wherein said alarm contact closure causes current to flow across said respective one of said connected lines and said respective one of said second subset is configured to receive said current.

3. The PBX of claim 2, wherein said CPU is configured to identify said current across said respective one of said connected lines as indicative of an alarm condition.

4. The PBX of claim 1, wherein said plurality of input/output circuits are configured to monitor said connected lines for a first predetermined impedance and a second predetermined impedance.

5. The PBX of claim 4, wherein said first predetermined impedance is indicative of a normal operating condition.

6. The PBX of claim 5, wherein said second predetermined impedance is indicative of an alarm condition.

7. The PBX of claim 1, wherein at least one of said telephony signals is identical to at least one of said alarm signals.

8. A telecommunications system, comprising:

a plurality of telephony devices;

a plurality of telephony lines coupled to said plurality of telephony devices; and a private branch exchange (PBX) coupled to said plurality of telephony lines, said PBX including:

a plurality of input/output circuits coupled to receive one or more signals over said plurality of telephony lines;

a central switching unit coupled to the plurality of input/output circuits and configured to provide connectivity for said one or more signals;

a central processing unit (CPU) coupled to said central switching unit and configured to control operation of said central switching unit; and a memory device coupled to the CPU and configured to store a database, said database including information identifying a first subset of said plurality of said input/output circuits as configured to receive telephony signals, and a second subset of said plurality of said input/output circuits as configured to receive alarm signals;

wherein the CPU is operable to access the database when said one or more signals are received at a respective input/output circuit to determine if said one or more signals are telephony signals or alarm signals; and wherein each of said second subset is configured to receive signals from over respective ones of said plurality of telephony lines indicative of an alarm contact closure from a respective one of said plurality of telephony devices coupled to a respective one of said second subset.

9. The telecommunications system of claim 8, wherein said alarm contact closure causes current to flow across said respective one of said plurality of telephony lines and said respective one of said second subset is configured to receive said current.

10. The telecommunications system of claim 8, wherein said CPU is configured to identify said current across said respective one of said plurality of telephony lines as indicative of an alarm condition.

11. The telecommunications system of claim 8, wherein said plurality of input/output circuits are configured to monitor said plurality of telephony lines for a first predetermined impedance and a second predetermined impedance.

12. The telecommunications system of claim 11, wherein said first predetermined impedance is indicative of a normal operating condition.

13. The telecommunications system of claim 12, wherein said second predetermined impedance is indicative of an alarm condition.

14. The telecommunications system of claim 8, wherein at least one of said telephony signals is identical to at least one of said alarm signals.

15. A method for operating a private branch exchange (PBX) comprising a plurality of input/output circuits coupled to receive signals over connected lines from external to the PBX, said method comprising:

storing information in a database identifying a first subset of said plurality of said input/output circuits as configured to receive telephony signals, and a second subset of said plurality of said input/output circuits as configured to receive alarm signals;

monitoring said plurality of input/output circuits for one or more predetermined conditions;

receiving a signal at one of said plurality of input/output circuits indicative of said one or more predetermined conditions;

accessing said database responsive to receiving said signal to determine whether said one of said plurality of input/output circuits is in said first subset or said second subset;

providing telephony functionality over a corresponding connected line of said one of said plurality of input/output circuits responsive to a determination that said one of said plurality of input/output circuits is in said first subset;

providing an alarm responsive to a determination that said one of said said plurality of input/output circuits is in said second subset; and wherein said one or more predetermined conditions is detection of a first impedance on a connected line connected to said one of said plurality of input/output circuits.

16. The method of claim 15, wherein said one or more predetermined conditions is detection of a second impedance on said connected line.

17. The method of claim 15, wherein said one or more predetermined conditions is a detection of a first current level.

18. The method of claim 17, wherein said one or more predetermined conditions is a detection of a second current level.

* * * * *